Joseph V Short  Inventor

Nov. 21, 1950  J. V. SHORT  2,531,001
AIRPLANE FUEL SERVICING UNIT

Filed Aug. 21, 1947  2 Sheets-Sheet 2

Joseph V. Short  Inventor

By W.O. Heilman  Attorney

UNITED STATES PATENT OFFICE 2,531,001

AIRPLANE FUEL SERVICING UNIT

Joseph V. Short, East Orange, N. J., assignor to Standard-Vacuum Oil Company, a corporation of Delaware Application August 21, 1947, Serial No. 769,936

1 Claim. (Cl. 222—176)

The present invention relates to an airport fuel dispensing unit, and in particular to a movable fueling unit, having a collapsible, elevated platform, for fueling airplanes from an underground pipeline system. The invention relates especially to such a unit in the use of which the need for physical contact of operators and equipment with the airfoil surfaces of the airplane, and particularly the leading edge and upper surface of the airplane wings is substantially reduced.

The fueling of modern aircraft presents an increasingly difficult problem. The larger airplanes have fuel capacities in excess of the largest tank truck feasible for refueling service. Airplane fuel tanks, usually mounted in the wings, are quite inaccessible. To fuel such planes, it is now necessary to use long ladders, and lengths of hose. The largest standard dispensing hose which can be satisfactorily handled manually is about 1½ inches in diameter. Such hose is only capable of delivering about 100 gallons per minute, as compared with the 200 gallons per minute, at a pressure of 5 pounds per square inch, considered to be necessary for efficient service. The hose sizes required for such flow rate cannot be satisfactorily handled manually as at present required. Even the hose now used results in a safety hazard to the fueling operators, and a considerable risk of damage to airfoil surfaces with which it and the operators necessarily come in contact.

The problem of supply has been substantially met by provision of pipe line distribution systems, with hydrant connections located at convenient points about an airport's runways and servicing areas. Such arrangements overcome the problem of adequate supply, avoiding the use of tank trucks. The problem of hose handling, however, including possible damage to airfoil surfaces, and personnel safety hazards would still exist.

It is an object of this invention to provide a mobile fuel servicing unit by means of which the risks of damage to planes and injury to personnel may be substantially avoided, while providing for a more efficient operation.

Figure 1:
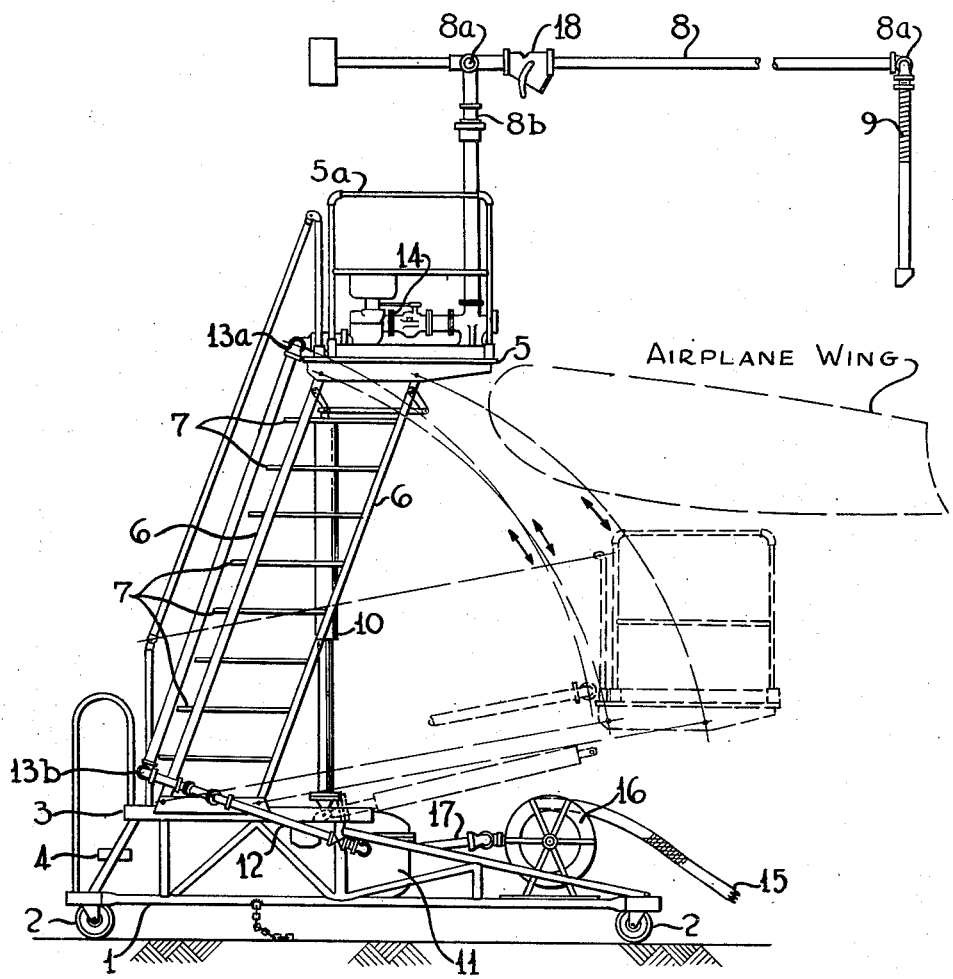

The invention and its objects may be more readily understood from the following description, when read in conjunction with the accompanying drawings, in which Fig. 1 is a side elevation showing the apparatus in use and also as disposed for movement.

Figure 2:
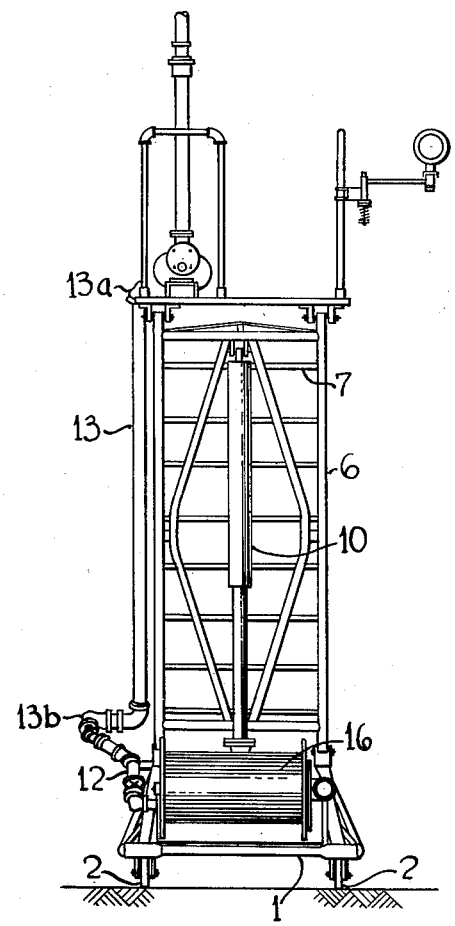

Fig. 2 is a rear end view of the structure.

Referring now to the drawings, the numeral 1 designates a substantially flat platform or truck body member provided with wheels 2, of which either two or all may be swivel mounted on the body 1. Mounted on the truck body at one end is a fixed platform 3, raised somewhat above the truck body and connected thereto by means of the supports 3a and steps 4. A collapsible platform unit 5 is connected to the fixed platform 3 by means of a framework 6, including steps 7. This framework is connected to both the platform 3 and platform 5 by pivot means to permit arcuate movement of the framework from a collapsed position to a raised position or vice versa. Disposition of the framework and loading platforms when collapsed for movement of the truck is shown by dotted lines in Fig. 1.

The platform unit 5 is provided with a safety railing 5a, and dispensing equipment including a metering unit and a counter-balanced loading arm 8, swivel jointed at 8a and 8b for movement through 360°, and at 8c for arcuate movement through 120° from a vertical position when not in use. A flexible hose member 9 extends downwardly from the outer end of the loading arm to provide for connection with the filler opening of an aircraft fuel tank as in the wing shown by dotted lines in Fig. 1. Means for elevating the platform 5, such as a hydraulic lifting mechanism 10 is pivotally connected between the platform 5 or framework 6 and platform 3.

Various other equipment, as required, including a booster pump, filters, etc. may be disposed on the truck body as indicated by the numeral 11, and is connected to the loading arm through rigid piping members 12 and a pipe or flexible hose member 13. The hose or pipe member 13 is connected to pipe 12 and dispensing equipment 14 on platform 5 by means of swing joints 13a and 13b. Preferably, connection is made to the airport pipeline distribution system or to a tank truck discharge valve by means of a flexible hose 15 mounted on a special reel member 16, having a hollow shaft connected to the inner end of the reeled hose and to the line 12, or equipment 11, as through the pipe 17. Where conditions permit, however, a comparatively short length of hose may be used as a detachable connection between the equipment, or connecting lines on the movable truck body and the source of fuel supply.

In operation, the truck 1 is wheeled into position adjacent the airplane to be serviced, the platform 5 is elevated, and the loading arm 8 and hose 9 positioned with respect to the tank inlet in the wing, by suitable movement at joints 8a, 8b, and 8c, by readjusting the position of the truck 1 or both. The hoses 9 and 15 are then connected to the airplane tank inlet and the fuel supply system respectively. By means of a valve 18 in the loading arm 8 an operator may then control the flow of fuel into the tank. When the operation is complete, the lines may be disconnected, the platform 5 depressed, and the unit moved on to the next fueling assignment. It is contemplated that suitable controls will be provided for operation of the platform lifting means to permit elevation of the loading platform to any height required within the elevating range of the framework 6 and the hydraulic mechanism 10.

Although the invention has been described in connection with its function as an airplane fueling unit, it is not limited to such use. It is contemplated further that it may be used equally as efficiently for the purpose of removing fuel from airplane storage tanks. It is also contemplated that various changes and modifications may be made in the apparatus as set forth above, entirely within the scope of the appended claim.

I claim:

Fuel servicing apparatus for airplanes consisting of a wheeled truck body, having a substantially level frame, a servicing platform carried by said body, including a collapsible supporting frame and ladder for said platform and means for elevating the platform above the truck body, a swivel mounted, counter-balanced, rigid conduit element mounted on said platform, having a flexible conduit portion for fluid-tight connection to an airplane fuel tank, fixed fuel supply means mounted on said truck body, a flexible conduit member freely supported longitudinally of said collapsible platform supporting frame, and of substantially the same length as said frame, said member secured at one end to said rigid conduit element, and, at the other end, to said fixed fuel supply means in rotatable fluid-tight relation to each, and flexible conduit means for connecting said fuel supply means to a reservoir system for fuel.

JOSEPH V. SHORT.

REFERENCES CITED

The following references are of record in the file of this patent:

UNITED STATES PATENTS

| Number | Name | Date |
| --- | --- | --- |
| 221,401 | Drake et al. | Nov. 11, 1879 |
| 483,001 | Hughes | Sept. 20, 1892 |
| 1,867,602 | Stukenborg | July 19, 1932 |
| 2,090,136 | McKee | Aug. 17, 1937 |
| 2,362,170 | Swaisgood | Nov. 7, 1944 |